United States Patent
Waegli et al.

(10) Patent No.: US 7,728,984 B2
(45) Date of Patent: Jun. 1, 2010

(54) METHOD FOR EVALUATING A MEASURED PARAMETER

(75) Inventors: Peter Waegli, Bremgarten (CH); Felix Mullis, Flums (CH)

(73) Assignee: Inficon GmbH, Bad Ragaz (CH)

( * ) Notice: Subject to any disclaimer, the term of this patent is extended or adjusted under 35 U.S.C. 154(b) by 130 days.

(21) Appl. No.: 12/053,951

(22) Filed: Mar. 24, 2008

(65) Prior Publication Data

US 2009/0219542 A1 Sep. 3, 2009

(30) Foreign Application Priority Data

Feb. 28, 2008 (CH) ................................ 0294/08

(51) Int. Cl.
 *G01B 9/02* (2006.01)
 *G01J 3/45* (2006.01)
(52) U.S. Cl. ........................ 356/480; 356/454
(58) Field of Classification Search ............... 356/35.5, 356/454, 480, 519
See application file for complete search history.

(56) References Cited

U.S. PATENT DOCUMENTS

| | | | | |
|---|---|---|---|---|
| 6,078,706 | A * | 6/2000 | Nau et al. | 385/12 |
| 7,099,015 | B2 * | 8/2006 | Melnyk | 356/480 |
| 7,259,862 | B2 * | 8/2007 | Duplain | 356/479 |
| 2005/0046862 | A1 | 3/2005 | Melnyk | |
| 2005/0151975 | A1 | 7/2005 | Melnyk | |
| 2007/0223000 | A1 * | 9/2007 | Gahan et al. | 356/454 |
| 2008/0204759 | A1 * | 8/2008 | Choi | 356/482 |

FOREIGN PATENT DOCUMENTS

| | | |
|---|---|---|
| EP | 0 571 106 A1 | 11/1993 |
| WO | WO 2007/019714 | 2/2007 |

OTHER PUBLICATIONS

Kentaro, Totsu et al, Ultra-miniature fiber-optic pressure sensor . . . :, Journal of Micro-mechanics & Microengineering, Inst. of Physics Publishing, Bristol, GB, vol. 15, No. 1.

* cited by examiner

*Primary Examiner*—Michael A Lyons
(74) *Attorney, Agent, or Firm*—Notaro, Michalos & Zaccaria P.C.

(57) ABSTRACT

For evaluation of a measured parameter with a measuring cell having a cavity which generates for light an optical path length difference changing corresponding to the variation of the measured parameter, the method includes: introducing light from a white light source with the aid of an optical waveguide via a coupler (3) disposed in the path of the optical waveguide into the cavity, coupling out at least a portion of the light reflected back into the optical waveguide from the cavity with the aid of the coupler and conducting this reflected light to an optical spectrometer, determining the optical spectrum of the reflected light in the spectrometer and generating a spectrometer signal, conducting the spectrometer signal to a computing unit, wherein the spectrometer signal is directly converted through the computing unit to an interferogram and from its intensity progression the location of the particular extremal amplitude value is determined and this particular location represents directly the particular value of the optical path length difference in the cavity, which comprises the measured parameter.

60 Claims, 6 Drawing Sheets

METHOD FOR EVALUATING A MEASURED PARAMETER

FIELD AND BACKGROUND OF THE INVENTION

The invention relates to a method for evaluating a measured parameter with a measuring cell, as well as to a measuring arrangement.

The invention relates to an evaluating method in connection with a fiber optic interferometric sensor measuring system for measuring measured parameters such as pressure, temperature, expansion and optical refractive indices. In particular, the simple and precise acquisition of vacuum pressures should be possible.

With measuring systems based on principles of interference, various measured parameters can be measured with high resolution and accuracy. Typical representatives of such measuring systems are such which are based on Fabry-Perot (FP) sensors. These measure the optical path length difference in the so-called Fabry-Perot sensor cavity. This path length difference changes as a function of the physical parameter to be measured and corresponds to the magnitude of the difference of the optical path length of light reflected at the front face of the cavity and that which is reflected at the rear face of the cavity. The optical path length difference is calculated from the product of the index of refraction of the material through which moves the light and the geometric path difference traversed by the light. Accordingly, an optical path length difference can change, for example, if the distance between two diaphragms forming the Fabry-Perot sensor cavity changes as a function of the pressure or this distance varies due to material expansion as a consequence of temperature changes. However, it can also vary, for example, through changes of the optical properties (refractive index) of a material located in the cavity or forming the cavity. Such a measuring system is comprised of a Fabry-Perot cavity which forms the sensor proper, a suitable evaluation unit and a light source. If, as the light source, a broadband or white light source with short coherence wavelength, such as, for example, an incandescent bulb or a white-light diode or Light Emitting Diode (LED) is utilized, this measuring system is referred to as White Light Interferometry (WLI). With WLI it is possible to measure absolutely the optical path length difference in the sensor cavity.

The sensor cavity is connected to the evaluation unit by an optical waveguide. The light from the light source is conducted to the sensor cavity via an optical waveguide. As a function of the optical path length or of the parameter to be measured, the light is modulated in this cavity. The modulated light is subsequently conducted back via the same or a separate second optical waveguide to the evaluation unit and evaluated here. The evaluation can, in principle, be realized in two different ways. For this purpose either an interferometer or a spectrometer is utilized.

Polarization and Fizeau interferometers have essentially become widely used as interferometer-based evaluation methods. The polarization interferometers are described in U.S. Pat. No. 7,259,862 B2 by Duplain, the Fizeau interferometers in U.S. Pat. No. 5,392,117 by Belleville et al. Spectrometer-based evaluation units are described in U.S. Pat. No. 6,078,706, Nau et al., as well as in U.S. Pat. No. 7,099,015 B2 by Melnyk. Details of an evaluation algorithm according to prior art can be found in the publication US 2005/0151975 A1 by Melnyk.

In current evaluation units high-quality spectrometers are employed. Their resolution is better than 1 nm and they use linear sensor arrays with more than 3500 discrete sensor elements (pixels). For each measuring cycle all sensor elements must always be read and digitized. The accumulated data quantity is proportional to the number of sensor elements and consequently also determining for the shortest possible cycle time. In the case of the currently utilized spectrometers this time is 50 ms, which corresponds to a maximal refresh rate of 20 Hz. The unit prices for such spectrometers are high, always far above $1,000.00 (typically $1499.00 to 1899.00, depending on the model).

In terms of their structure, Fizeau and polarization interferometers are largely equivalent as shown schematically in FIGS. 1 and 2. Both require inter alia an optical wedge 30 which must be appropriately precisely manufactured. The structure of a Fizeau interferometer is schematically depicted in FIG. 1 (see also U.S. Pat. No. 5,392,117, Belleville). In the Fizeau interferometer this wedge must be provided with reflection layers. The structure of a polarization interferometer is schematically shown in FIG. 2 (see also U.S. Pat. No. 7,259,862 B2, Duplain). Instead of the reflection layers, the wedge 30 in the polarization interferometer utilizes polarizers. Such a wedge with the necessary layers, respectively polarizers, is complex and therefore expensive in production and has undesirable dispersion effects which affect the resulting interferogram and reduce the attainable measuring accuracy. The optical path length in the wedge is also temperature dependent. This dependence can be (partially) compensated, yet has nevertheless a disadvantageous effect on the attainable accuracy and entails increased complexity and expenditures for the realization.

Both interferometer principles, moreover, only supply relative measurement values, i.e. both must be calibrated during the production in order to yield absolute measurement values. In both principles the measuring range is defined by the wedge and, consequently, is fixed. The greatest measurable optical path length is determined by the greatest thickness and the smallest measurable optical path length by the smallest thickness of the wedge. The attainable resolution, defined by the "slope" of the wedge is also fixed.

The attainable measuring accuracy depends inter alia on the contrast and the signal-to-noise ratio of the measuring signal. These values, in turn, are affected by the modulation depth of the sensor and the length or attenuation of the optical waveguide by which the sensor is connected with the evaluation unit. The modulation depth (ratio of modulated to non-modulated light) is determined by the optical coupling system and the optical properties of the sensor cavity. For the partially transmissive mirrors of the cavity a reflection of approximately 25% is ideal. In practice this can only be achieved under high complexity and expenditure with corresponding optically effective coatings. However, such are not realizable in every case and one is forced to utilize non-coated glass surfaces as mirrors or partially transmissive mirrors. Depending on the material used, these still have each only a reflection of approximately 4%. In such a case a measurement signal is obtained with very poor contrast or a very low signal-to-noise ratio. In this case for the evaluation of the measuring signal very high expenditures must be spent and the attainable accuracy is limited.

A spectrometer-based evaluation unit is described in U.S. Pat. No. 7,099,015 B2 by Melnyk. FIG. 3 shows the schematic structure of a corresponding measuring system. A significant disadvantage of this arrangement proposed here, is the complicated calculation of the measured value via normalization of the measured spectrum, direct Fast Fourier Transformation (FFT), bandpass filters, inverse FFT, adding of the phase and subsequent determination of the measured value from a lookup table. This calculation is described in U.S. Pat. No. 7,099,015 B2 by Melnyk and is typically realized with a Digital Signal Processor (DSP) 32. The measured spectrum must also be normalized which, in addition to the measuring sensor 5, presupposes a second reference sensor 31.

US 2005/0151975 A1 discloses an alternative calculation method. FIG. 4 shows the schematic structure of such a measuring system. The alternative calculation method is based on the correlation of measured spectrum with predetermined and stored theoretical spectra. A significant disadvantage is here the store 34 necessary for the storage of the predetermined spectra as well as the calculating time of the corresponding computing unit 32 necessary for the calculation of the correlation 33. The attainable measuring accuracy, moreover, depends on the number of stored spectra and therewith on the available storage space but also on the available calculating time. If one wishes to cover a greater measuring range from, for example, 10 µm up to 100 µm, and attain a resolution in the subnanometer range of, for example, 0.01 nm, approximately 9000 spectra need to be predetermined and stored if it is assumed that a reference spectrum is required every 10 nm. To find in this case the correct one out of this quantity by means of correlation calls for considerable calculation expenditures. While, as described in the (laid open) patent application US 2005/0151975 A1 by Melnyk, this can be reduced again through additional algorithms, it remains nevertheless immense, especially when high accuracy is the goal. Furthermore, the described simplifications (tracking) for the reduction of the necessary calculating time function only if the measuring signal does not change significantly within one measuring cycle. In the case of relatively larger measurement value changes or signal jumps, the tracking method no longer functions since in this case tracking is no longer even possible. If the measuring instrument is to be employed in a stable regulation circuit, in order to be able to ensure stability, the maximal measuring cycle time or response time of the measuring instrument must in this case be assumed. For the reasons just cited (fast signal change, signal jumps) the tracking has thus no influence on the minimal measuring cycle time.

Evaluation units such as are described in U.S. Pat. No. 7,099,015 B2 by Melnyk or in US 2005/0151975 A1 by Melnyk require high-quality spectrometers. Such must have a resolution better than 1 nm and are correspondingly expensive. The unit prices for such spectrometers are always far higher than $1000 (typically $1499 to $1899, depending on the model). The linear sensor arrays utilized in the spectrometers are comprised of more than 3500 discrete sensor elements (pixels), conventionally 3648 pixels. For each measuring cycle all sensor elements must always be read and digitized. The accumulated data quantity is proportional to the number of sensor elements and consequently also determining for the shortest possible cycle time. In the case of the currently utilized spectrometers this time is 50 ms, which corresponds to a maximal refresh rate of 20 Hz.

In summary, it can be stated that the described spectrometer-based methods are unsuitable for industrial implementation, since they require too many resources (storage, computing power), do not permit fast regulation applications and are too expensive.

SUMMARY OF THE INVENTION

The present invention consequently addresses the problem of eliminating the disadvantages entailed in prior art. The present invention in particular addresses the problem of determining from the optical spectrum of an interferometric sensor (for example Fabry-Perot), measured by means of a simple spectrometer, the absolute optical path length difference in this sensor simply and fast, precisely and with high resolution. Evaluation units based on this method must be economically producible.

In the introduced methods the problem is solved according to the characteristics of patent the claim as well as with a measuring arrangement according to the invention. The dependent patent claims relate to advantageous further developments of the invention.

The execution of the method according to the invention takes place in the following manner: a measuring cell contains a cavity for the evaluation of a measured parameter, with which for light an optical path length difference ($d_{Gap}$) is generated. Light is thus coupled into the cavity and reflected within in and coupled out again. The optical path length difference in this cavity changes following according to the variation of the measured parameter. The evaluation of the measured parameter comprises the following steps:

introducing light into the cavity from a white light source with the aid of an optical waveguide via a coupler disposed in the path of the optical waveguide, coupling out at least a portion of the light reflected back from the cavity into the optical waveguide with the aid of the coupler and conducting this reflected light to an optical spectrometer, determining the optical spectrum of the reflected light in the spectrometer and generating a spectrometer signal, conducting the spectrometer signal to a computing unit, wherein the spectrometer signal is directly converted through the computing unit for different optical path length differences d to an interferogram I(d) and from its intensity progression the location of the particular extremal amplitude value ($I_{extremal}=I(d_{Gap})$ is determined and this particular location therewith represents directly the particular value of the optical path length difference ($d_{Gap}$) in the cavity which comprises the measured parameter.

According to the present invention it is consequently possible to determine with a calculation function in a computing unit from the spectrum directly, without circuitous routes, the interferogram which contains as the output signal directly the unit of length which corresponds to the optical path length difference and consequently to the parameter to be measured. The calculation function preferably contains, at least in a first approximation, a cosine function. The cosine function surprisingly makes possible the high simplification of the entire signal processing and of the measuring arrangement. It is understood, that by this are also understood purely trigonometrically transformed representations of a cosine function, which are subsequently represented, for example, with the other angle functions, such as sine, tangent, cotangent functions or corresponding approximations.

It is also possible that the coupling-out of at least a portion of the light reflected from the cavity takes place with at least one further or several optical waveguides which are disposed separately next to the feeding optical waveguide. Alternatively, several optical waveguides can also be utilized for coupling the light into the cavity and for coupling out the light reflected from the cavity, which, for example, are disposed jointly in a mixed bundle of fibers leading to and away. In every case, however, the reflected light is conducted to an optical spectrometer. The embodiment with only one optical waveguide and one coupler is, however, less complex, yields more accurate results and is therefore preferred.

The present invention is especially suitable for the highly precise acquisition of vacuum pressures, in particular using so-called diaphragm vacuum measuring cells, in which the cavity is directly integrated in the measuring cell and the diaphragm is deformed depending on the vacuum pressure to be measured and directly closes off the cavity, and through its deformation the signal to be measured determines the optical path length difference. Such measuring cells can be structured especially compactly and, due to the integrally fitting and well matched measuring concept, permit especially precise and reproducible measurements over large measuring ranges while being economical of production. A further significant advantage comprises that such measuring cells can be built substantially of ceramic materials, such as aluminum oxide and/or sapphire including the measuring diaphragm, which makes such measuring cell highly resistant to chemically aggressive vacuum processes even at high temperatures. The optical read-out process enhances the suitability for high temperatures and is also nonsensitive against disturbing electrical or electromagnetic influences, which enhances the high measuring sensitivity and stability of such a measuring cell. In current vacuum processes, for example in the semiconductor industry, such especially high requirements are assuming increasingly greater importance.

The various features of novelty which characterize the invention are pointed out with particularity in the claims annexed to and forming a part of this disclosure and are entirely based on the priority application, namely Swiss Patent Application No. 00294/08 filed Feb. 28, 2008.

BRIEF DESCRIPTION OF THE DRAWINGS

In the following the invention will be described schematically and by example in conjunction with Figures.

Therein depict.

DESCRIPTION OF THE PREFERRED EMBODIMENT

FIGS. 1 to 4 depict schematically known measuring systems based on optical interference principles, which systems have already been described in the introduction.

Figure 1:
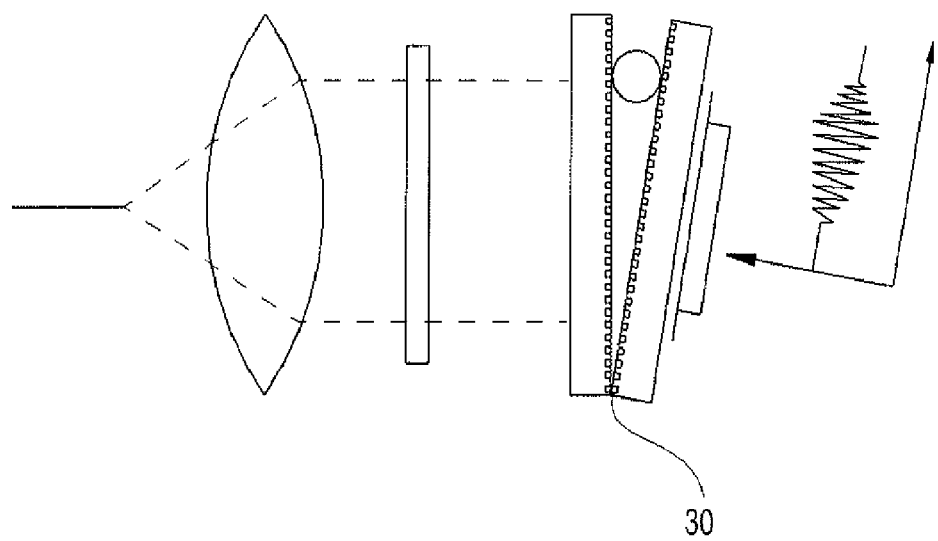
FIG. 1 a fundamental diagram of a Fizeau interferometer according to prior art.
Figure 2:
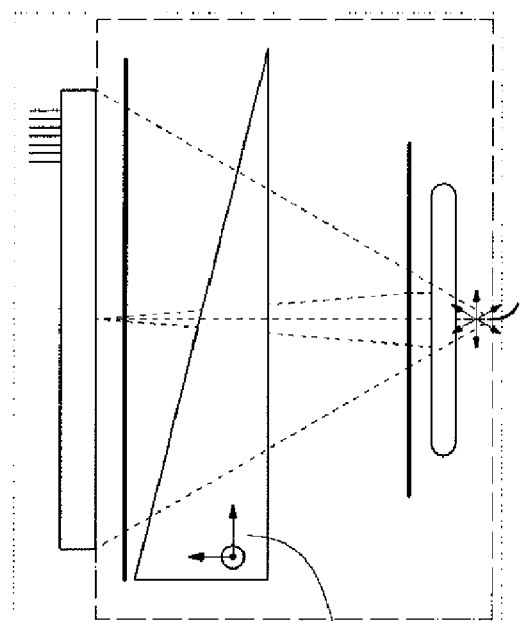
FIG. 2 a fundamental diagram of a polarization interferometer according to prior art, FIG. 3 an optical interferometric measuring system based on an optical spectrometer with a second reference sensor for the normalization of the measuring signal according to prior art, FIG. 4 an optical interferometric measuring system based on an optical spectrometer with a computing unit with storage for correlation with reference spectra for the determination of the measured parameter according to prior art, FIG. 5 a configuration of a measuring system according to the invention, FIG. 6 an optical spectrum of the light reflected from the cavity which contains the measured parameter, FIG. 7 an interferogram determined from the optical spectrum according to the procedure following the present invention, FIG. 7a an enlarged segment of the interferogram of FIG. 7, FIG. 8 a measuring configuration with a preferred vacuum diaphragm measuring cell as a measuring sensor, FIG. 9 a measuring configuration with a temperature measuring cell as a measuring sensor.
Figure 3:
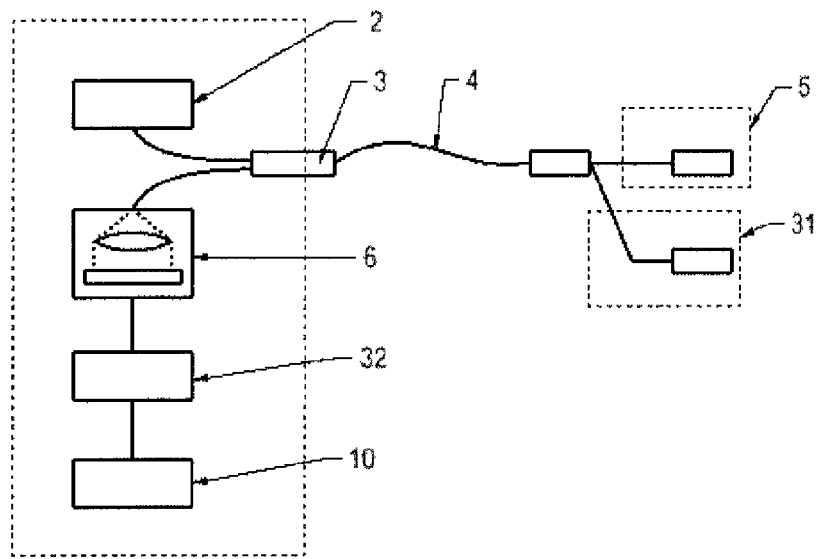
Figure 4:
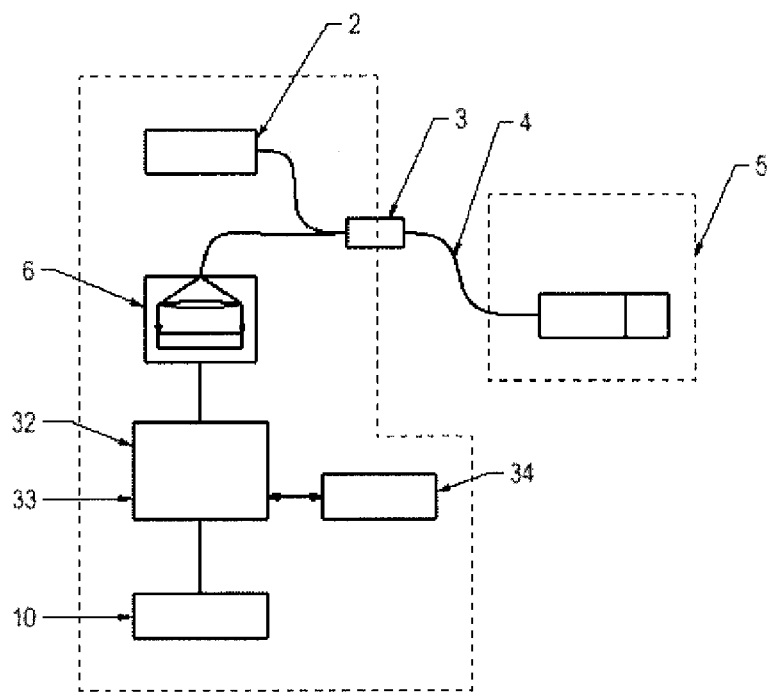
Figure 5:
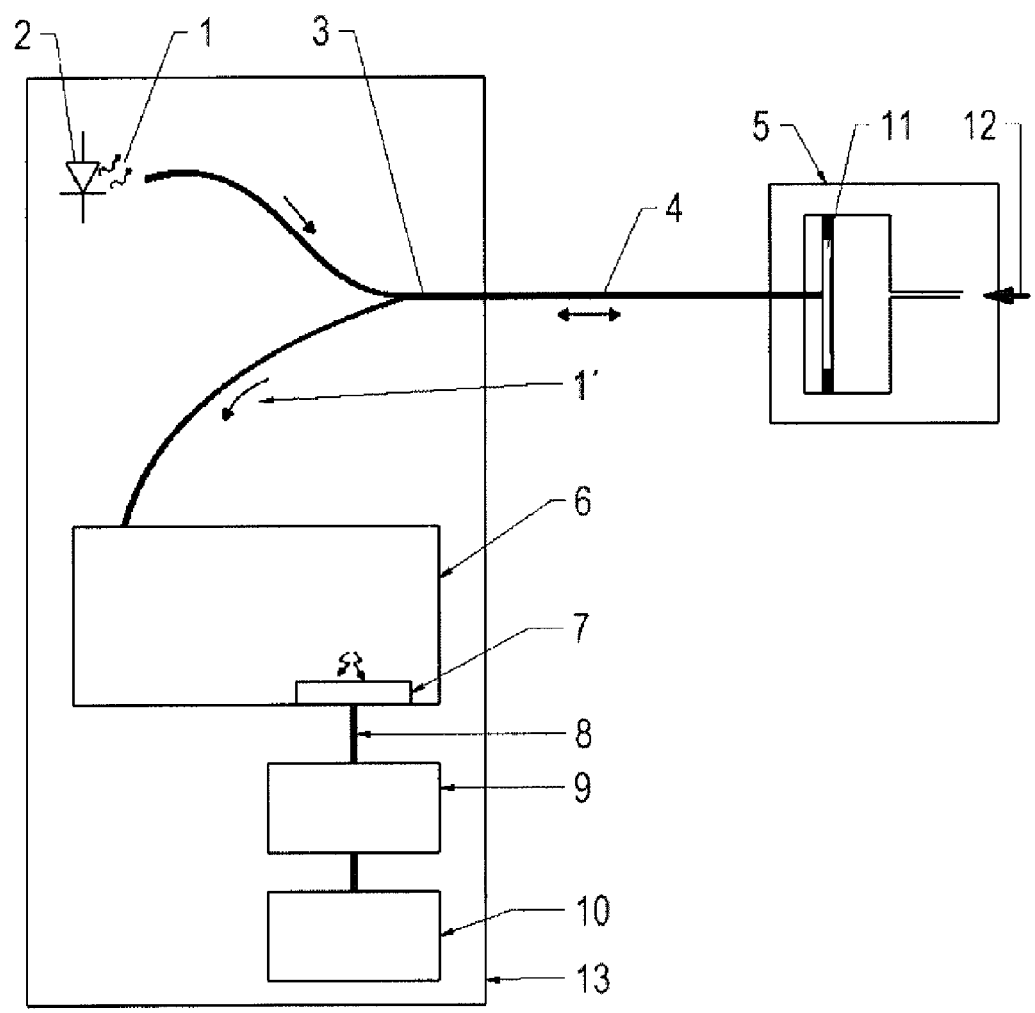

FIG. 5 depicts a typical structure of a preferred diaphragm-based Fabry-Perot measuring system. The system is comprised of an evaluation unit 13 and a sensor 5 which are connected by means of optical waveguide 4 with the evaluation unit 13. Light 1 from a white light source 2 is conducted via a coupler 3 and optical waveguide 4 to the measuring sensor 5 developed as a Fabry-Perot sensor 5 with a cavity 11, and is modulated in such a cavity as a function of the parameter to be measured. The modulated light is conducted via the same optical waveguide 4 and coupler 3 to an optical spectrometer 6. This spectrometer 6 generates an output signal, the spectrometer signal 8, by measuring overall m0 intensity values $s_\lambda(\lambda_m)$ at the different wavelengths $\lambda_m$. Each value $s_\lambda(\lambda_m)$ corresponds to the measured intensity at the wavelength $\lambda_m$. In the spectrometer 6 the optical spectrum is picked up for example with a linear sensor array 7 and converted into a corresponding electrical signal and processed to the spectrometer signal 8. The spectrometer linear sensor array output signal 8, or the spectrometer signal 8, is conducted at the output of the spectrometer 6 with a spectrometer signal line across a corresponding electric interface to a computing unit 9 where this signal is converted with a calculation function. The computing unit 9 conducts the converted signal further to the output unit 10 where the signal can be processed in desired form, for example as an analog or a digital electrical or optical signal for further use.

The cavity 11 is formed by two mirrors 19, 19' which are disposed at a geometric mirror distance ($d_{geo}$). At least one of these mirrors 19, 19' is preferably implemented such that it is partially transmissive for the light. A portion of the light 1 is conducted via one of the partially transmissive mirrors 19 into the cavity 11, and this portion is now reflected back and forth between the partially transmissive mirrors 19 and 19', wherein with each reflection on the partially transmissive mirror 19 a portion of the light is again coupled out of the cavity, which portion interferes with the portion of the light 1 reflected here and not coupled in and, specifically, as a function of the different path distances traveled by the two light portions corresponding to an integer multiple of the optical path length difference ($d_{Gap}$) which is defined by the cavity or the geometric distance ($d_{geo}$) of the two partially transmissive mirrors 19, 19'. If the cavity 11 is comprised of a material with the index of refraction 1 (for example air or vacuum), this optical path length difference ($d_{Gap}$) is approximately twice as large as the mirror distance ($d_{geo}$). It is advantageous if, for the problems to be solved here using measuring techniques, the cavity 11 is developed such that here an optical path length difference ($d_{Gap}$) is formed which is in the range of 10.0 μm to 400 μm, preferably in the range of 20.0 μm to 60.0 μm. Partially transmissive mirrors can be formed, for example, as coated surfaces. However, depending on the substrate material, such as for example glass or sapphire, with a suitable surface these can also serve directly as partially transmissive mirrors. The measured parameter 12 to be measured at the measuring cell 5 changes the mirror distance $d_{geo}$ accordingly. This change is subsequently acquired with the present configuration and the method and permits the precise and reproducible representation of the measured parameter 12 which consequently is provided in processed form at the output 10 of the configuration.

As the optical spectrometer 6 any commercially available spectrometer can be utilized which covers the spectral range of the light source and has a resolution better than 4 nm FWHM (Full Width at Half Maximum). When using a white LED as the light source, the wave length range from 430 nm to 730 nm must be covered. As a spectrometer sensor element 7 also a commercially available linear sensor array (Charge Coupled Device (CCD), Complementary Metal Oxide Semiconductor (CMOS), Photo Diode Array (PDA)) with at least 256 sensor elements (pixels) can be utilized. A CMOS array with 512 sensor elements is preferably used.

When using an array with, for example, 512 sensor elements, consequently for m a typical range from m=1 to m0-512 results, which corresponds to wavelengths $\lambda_m$ of typically 430 nm to 730 nm.

Figure 6:
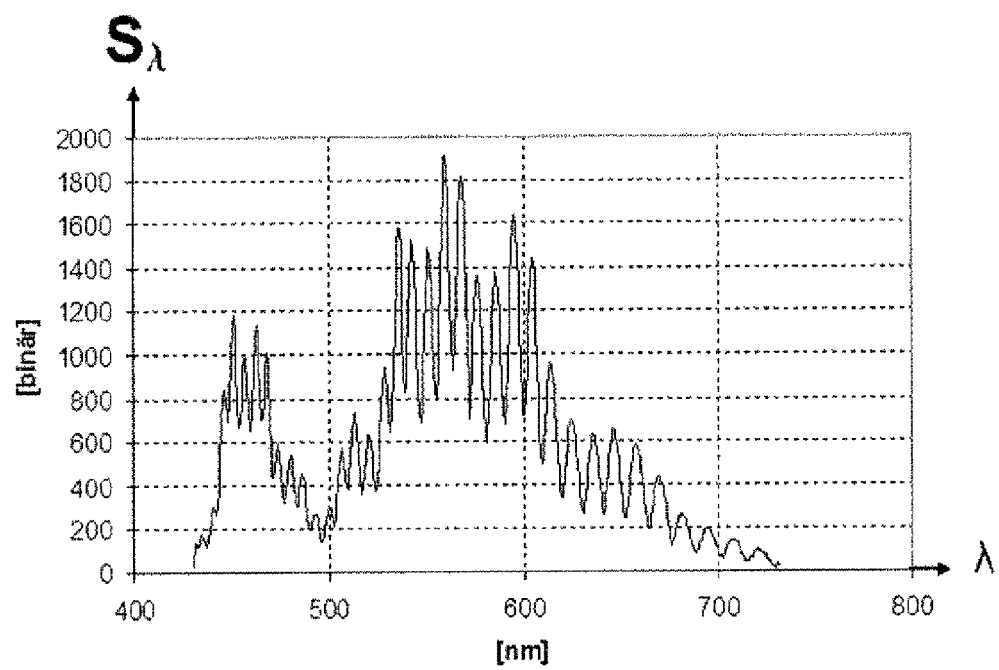
Figure 7:
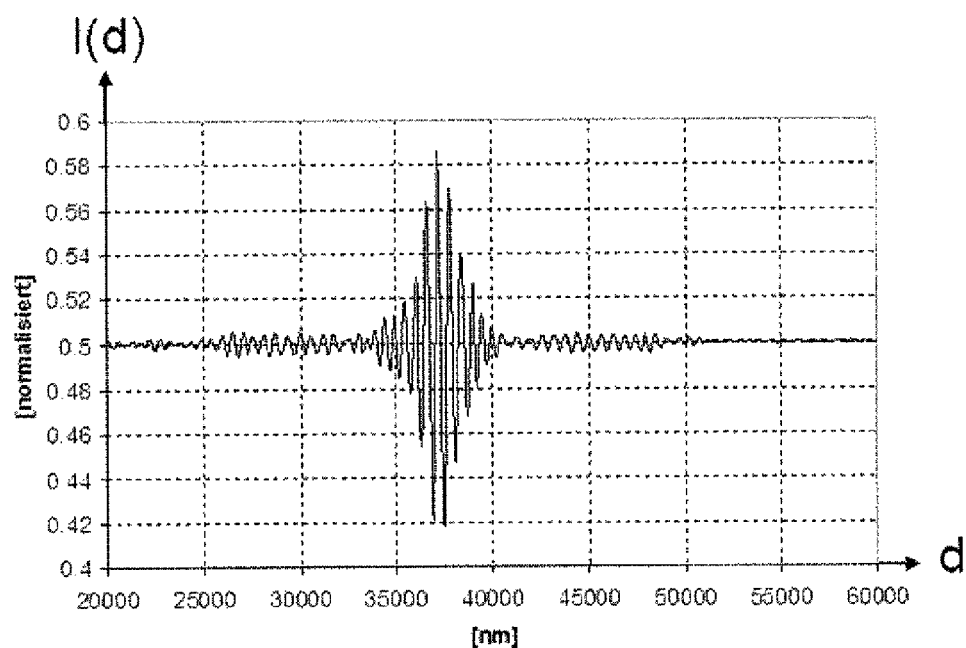
Figure 7A:
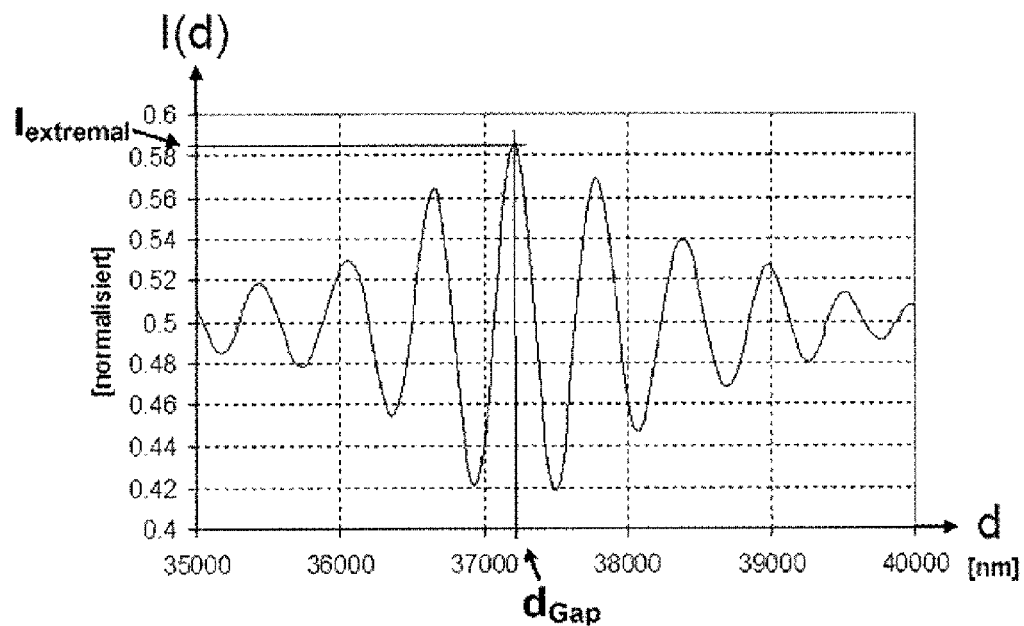

In a next step the measured spectrometer signal 8 is directly converted by the computing unit 9 with the aid of a calculating function directly to an interferogram I(d), I'(d) and from its intensity progression the location of the particular extremal amplitude value $I_{extremal}$ is determined and this particular location represents directly the particular value of the optical path length difference ($d_{Gap}$) in the cavity which contains the measured parameter 12. The determination of an absolute value with the physical unit of length, such as for example nanometer [nm], is surprisingly possible directly without the use of additional reference measuring configurations, correlation functions and complicated algorithms. An example of a measured spectrogram is shown in FIG. 6 and the interferogram determined therefrom with the calculating function is shown in FIGS. 7 and 7a.

Especially good results with low expenditure are obtained if the calculating function for the conversion into the absolute interferogram contains preferably, and at least in a first approximation, a cosine function. With a highly suitable procedure, for example, the measured spectrometer signal 8 is transformed with the aid of a calculating function, which preferably and at least in a first approximation contains a cosine function, through the computing unit 9 for k0 discrete values $d_k$ according to formula (2) directly to an interferogram $I(d_k)$, according to formula (1) or $I'(d_k)$ according to formula (1').

In this interferogram $I(d_k)$ or $I'(d_k)$ subsequently the location ($d_{Gap}$) of the extremal amplitude value $I_{extremal}$ is determined according to formula (4). This value corresponds now precisely to the sought optical path length difference ($d_{Gap}$) which comprises the measured parameter to be measured. The necessary calculations are carried out by means of a computing unit 9 suitable for this purpose. For this unit are especially well suited a microprocessor and/or a Digital Signal Processor (DSP) and/or a Field Programmable Gate Array (FPGA) and/or a Gate array.

$$I(d_k) = \frac{\sum_{1}^{m0} S_\lambda(\lambda_m) * (1 + \cos(2*\pi*d_k/\lambda_m))}{2*\sum_{1}^{m0} S_\lambda(\lambda_m)} \quad (1)$$

The denominator as well as the first term in the numerator are, for example, provided for normalizing or scaling the signal. For the calculation of the optical path length difference ($d_{Gap}$) in the cavity these additional functions are not necessary and the formula (1) can be simplified to:

$$I'(d_k) = \sum_{1}^{m0} S_\lambda(\lambda_m) * \cos(2*\pi*d_k/\lambda_m) \quad (1')$$

As already stated, this basic function with the relevant cosine function can be combined or superimposed additionally with further calculating functions if further signal adaptations are desired.

Each node k corresponds to an optical path difference $d_k$, i.e. the interferogram is calculated between the values $d_{min}$ and $d_{max}$ for a total of k0 nodes. Namely for $d_k$ applies:

$$d_k = d_{min} + \Delta d * (k-1) mit \quad (2)$$

$$\Delta d = \frac{d_{max} - d_{min}}{k0 - 1} \quad (3)$$

A typical range is k=1 to k0=1024 which corresponds to equivalent Fabry-Perot mirror distances ($d_{geo}$) of, for example, typically 10 μm to 30 μm.

For the technical measuring applications introduced here, and in particular for the use of vacuum diaphragm cells of high quality, for mirror distances ($d_{geo}$) preferably distances in the range of 5.0 μm to 200 μm, preferably in the range of 10.0 μm to 30.0 μm, should be formed.

The optical path length difference in the Fabry-Perot sensor now corresponds precisely to that value $d=d_{Gap}$ at which the extremal amplitude value $I_{extremal}$ in the interferogram is developed. At an index of refraction of 1 (for example in vacuo) the optical path length difference corresponds precisely to the twofold mirror distance. This is true under the assumption that the light 1 is precisely and exclusively incident perpendicularly on the cavity 11, or the mirror surfaces 19, 19', and is reflected by them.

The exact position of the extremal amplitude value $I_{extremal}$ of the interferogram $I(d_k)$ or $I'(d_k)$ is most simply determined by means of a quadratic approximation (quadratic fit).

Investigations with respect to the influence of the number of nodes (size of the "fit window") utilized for the approximation have shown that a window size of 3 points yields the most precise results. Therefrom results the following procedure for determining the exact location of the extremal amplitude value $I_{extremal}$:

1. in the array with the interferogram values $I(d_k)$ or $I'(d_k)$ the extremal value $I_{extr}$ is sought, this supplies also the associated index value $d_{extr}$,
2. subsequently the two adjacent interferogram values $I_{extr-1}$ at site $d_{extr}-\Delta d$ and $I_{extr+1}$ at site $d_{extr}+\Delta d$ can be determined,
3. these three points define a quadratic function whose apex can be exactly determined by setting to zero the 1st derivation,
4. the position $d_{Gap}$ (optical path length difference) of this apex now corresponds exactly to the optical path length difference in the Fabry-Perot sensor, thus:

$$d_{Gap} = d_{extr} + \Delta d * \frac{I_{extr-1} - I_{extr+1}}{2*(I_{extr-1} 2*I_{extr} + I_{extr+1})} \quad (4)$$

It is understood that it is also feasible to utilize more than 3 nodes for calculating the apex by means of a quadratic polynomial. In this case the preferred method for calculating the quadratic polynomial (polynomial fit) for the exact determination of the apex would be the method of orthogonal polynomials. This method also utilizes the equidistant intervals ($\Delta d$) of the nodes in the interferogram I(d) or I'(d).

The relationship between optical path length difference $d_{Gap}$ and geometric mirror distance ($d_{geo}$) is defined by the formula (5):

$$d_{Gap} = 2*n*d_{geo}*C \quad (5)$$

Herein n represents the optical index of refraction of the material in the sensor cavity 11 and C is a correction factor which takes into consideration the effect of the angle of incident of the light into the sensor cavity 11 as well as also the corresponding intensity distribution of the light over all angles of incident. Consequently, the mirror distance as well as the optical path length difference can be determined absolutely and directly without circuitous routes via correlations in the appropriate physical unit of length such as for example nanometer [nm].

For a direct coupling of a gradient index optical waveguide with a 62.5 μm fiber to the cavity, C is calculated as 0.987887. When using the same optical waveguide, but with an additional optical coupling system with a lens 17 with a magnification of 4, a value for C of 0.999241 results.

Depending on the sensor utilized, formula (5) can now be solved for the parameter of interest. For example, in diaphragm-based pressure sensors according to FIG. 8, the geometric distance $d_{geo}$ of cavity 11 changes as a function of the measured parameter 12 to be measured, for example of the pressure 12 to be measured. Cavity 11 is normally filled with air or it is evacuated. In both cases the refractive index n can be assumed as 1. In addition, it is independent of the pressure to be measured and formula (5) can be solved for $d_{geo}$ and a measurement for the pressure is obtained directly.

Figure 9:
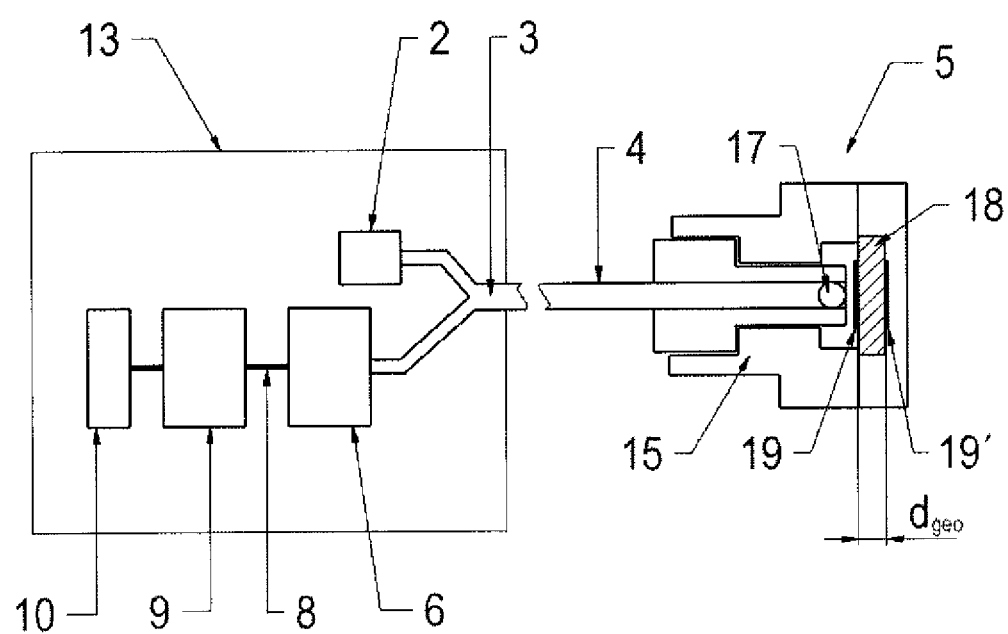

With temperature sensors, such as shown for example in FIG. 9, the refractive index of the material 18 in cavity 11 changes as a function of the temperature to be measured at (as much as possible) constant geometric distance $d_{geo}$ of the cavity. In this case formula (5) is solved for n and a measurement for the temperature is obtained directly.

In the following Table 1 all of the utilized mathematical identifiers are compiled and defined in an overview:

FPGAs with a parallel calculation architecture support such calculations very well. Thereby correspondingly fast cycle times of <1 ms can be attained for the complete calculation of an interferogram including the exact determination of the extremal amplitude value $I_{extremal}$ without encountering any problems. In contrast to the spectrometric method according to prior art, no additional storage means 34 for storing (previously) calculated or measured reference spectra is necessary and the necessary calculating time is significantly shorter compared to that necessary for the corresponding correlation calculations 33. Therefore, simpler and consequently less expensive, and also more robust evaluation units can be built. If the algorithm is implemented on an FPGA, it can be carried out without problems within considerably less than 1 ms and consequently the necessary calculation time has no longer any influence on the system cycle time. This is now determined by the necessary integration time of the linear array sensor element 7 (CCD array) in the spectrometer 6. When using commercially available standard parts (spectrometer 6, optical waveguide 4, coupler 3) of a commercially available white LED 2 (beginning with the year of manufacture 2007) as a light source as well as the simplest possible FABRY_Perot sensor 5 (with an uncoated cavity) a minimal integration time of 1 ms can still just be reasonably attained.

The method according to the invention permits utilizing significantly simpler and thus less expensive spectrometers 6. According to prior art spectrometers are employed which have a resolution of considerably better than 1 nm FWHM. These must only have a minimal resolution of better than 4 nm FWHM and can therefore be manufactured significantly less

TABLE 1

| Identifier | Definition/Description |
| --- | --- |
| m0 | number of sensor elements (pixels) of the linear sensor array in the spectrometer |
| m | index of vector defined over all sensor elements |
| $\lambda$ | wavelength |
| $\lambda_m$ | wavelength corresponding to the mth sensor element |
| $s_\lambda$ | total measured spectrum, vector over all sensor elements |
| $s_\lambda(\lambda_m)$ | measured intensity value of the spectrum at wavelength $\lambda_m$ or measurement value yielding the mth sensor element |
| k0 | number of nodes for which the interferogram is calculated, this value defines the resolution of the interferogram |
| k | index of vector defined by all calculated interferogram values |
| d | optical path length difference |
| $d_{min}$ | starting value (minimal value) starting from which the interferogram is calculated |
| $d_{max}$ | final value (maximal value) up to which the interferogram is calculated |
| $\Delta d$ | step width for calculating the interferogram (distance between two adjacent interferogram values) |
| $d_k$ | optical path length difference at site k (index) |
| $I(d_k)$ | normalized interferogram value calculated for the optical path length difference $d_k$ |
| $I'(d_k)$ | non-normalized interferogram value calculated for the optical path length difference $d_k$ |
| $I(d)$ | calculated interferogram values plotted over the optical path length difference d (d runs from $d_{min}$ to $d_{max}$ according to equations (2) and (3)) |
| $I_{extremal}$ | extremal amplitude value in the interferogram |
| $I_{extr}$ | extremal value in the array I(d); this defines the associated index $d_{extr}$ |
| $I_{extr-1}$ | $I(d_{extr} - \Delta d)$; interferogram value at site $d_{extr} - \Delta d$ |
| $I_{extr+1}$ | $I(d_{extr} + \Delta d)$; interferogram value at site $d_{extr} + \Delta d$ |
| $d_{extr}$ | associated index of $I_{extr}$ in array I(d) |
| $d_{extr-1}$ | $d_{extr} - \Delta d$; index of $I_{extr-1}$ |
| $d_{extr+1}$ | $d_{extr} + \Delta d$; index of $I_{extr+1}$ |
| $d_{Gap}$ | optical path length difference of Fabry-Perot cavity |
| $d_{geo}$ | geometric (mirror) distance of cavity |
| n | (optical) refractive index of the material with which the cavity is "filled" |
| C | correction factor which takes into consideration the effect of the angle of incident and the corresponding intensity distribution of the light into the sensor cavity |

The method according to the invention is very simple in implementation since primarily sums of products need to be calculated such as occur in the calculation of Fourier transformations. Therefore commercially available DSPs and expensive and thus also smaller. With such simple spectrometers, however, it is nevertheless possible, for example, to measure optical path length differences ($d_{Gap}$) of, for example, 36 μm with a standard deviation better than 0.01 nm.

The spectrometers 6 according to prior art are, furthermore, equipped with linear sensor arrays 7 which typically include 3648 sensor elements (pixels). For each measuring cycle all sensor elements must always be read and digitized. The accumulating data quantity is proportional to the number of sensor elements and thus also determining for the shortest possible cycle time. For the currently utilized spectrometers this time is 50 ms, which corresponds to a maximal refresh rate of only 20 Hz. However, the method according to the invention now permits utilizing spectrometers with linear sensor arrays 7 with sensor elements which are now only 512. This reduces the data quantity considerably and cycle times of less than 1 ms or refresh rates greater than 2 kHz can be attained. This is a significant advantage compared to prior art (50 ms and 20 Hz, respectively) since therewith inter alia faster and more stable regulation systems can be built in which the optical measuring principle serves for the acquisition of instantaneous values (for example throughflow regulation or mass flow controllers).

All of the methods according to prior art require calculating complexity and expenditure which to some extent are considerable in order to prepare the measured interferogram or spectrum for the further evaluation. The problems in this regard have already been described in the introduction. The spectrometer-based methods according to prior art also require a corresponding signal preprocessing before the evaluation (correlation) proper can be started. The method according to the invention permits, however, evaluating the measured spectrum directly and without any hard or software preprocessing or filtering.

A further advantage of the invention is also that the measuring system can be adapted very simply to different cavities (optical path length difference) as well as to the desired resolution (Δd) through corresponding software selection of the calculation range ($d_{min}$, $d_{max}$). In the case of interferometer-based systems this is only possible by means of a change of the hardware (thickness of wedge 30) and in the known spectrometer-based systems new reference data for the correlation calculation must be loaded into the storage means. Due to the method according to the invention, it is therefore very simply possible to run first a "rough scan" over a large range (large $d_{max}-d_{min}$) with poor resolution (large Δd) in order to determine on this basis the approximate location of the extremal amplitude value $I_{extremal}$. In the next measuring cycle the exact location can then be determined with high resolution, but therefore with restricted measuring range (range about the location of the previously determined extremal amplitude value $I_{extremal}$). Such adaptation in terms of "software" or optimization of the measuring system is not even possible with interferometer-based measuring systems and in the known spectrometer-based systems entails additional complexity and expenditure for providing the data necessary for the correlation calculation.

The methods according to prior art already described are based on the correlation method. In this method the measured spectrum must be subjected to a Fast Fourier Transformation (FFT). The result of this FFT is subsequently correlated with the stored values in order to calculate the measured value. To calculate a measured value, thus, an FFT and a succeeding correlation is always necessary. The calculating complexity and expenditure for determining the FFT from the measured spectrum corresponds to those which are necessary for calculating the interferogram according to the method according to the invention. The calculating complexity and expenditure for the correlation are completely unnecessary in the procedure according to the invention. The method according to the invention thus requires shorter calculating times and permits thereby shorter measuring cycle times and faster response times, respectively. In comparison to prior art, this, in turn, permits faster and more stable regulator applications. Fast signal changes or signal jumps can thereby also be acquired and tracked better. If the method is realized, for example, with an FPGA, the calculating time can be lowered to below 1 ms without any problem, i.e. the system cycle time is no longer determined by the calculating time of the method, but rather by the necessary integration time of the linear sensor array 7 of the spectrometer 6 which depends on the available luminous power at the linear sensor array 7 as well as on its sensitivity and its noise properties.

The interferogram calculation described in (1) and (1') due to the sum formation applied leads already to a strong reduction of the signal noise. However, due to the fast measuring cycle time, other additional filter functions such as for example sliding mean value can also be realized without therein unduly increasing the response time of the measuring apparatus. With such filter functions, for example, the resolution can be further increased or the minimal requirements made of the necessary signal-to-noise ratio (signal quality) can be further reduced. Consequently, even longer connection cables 4 between measuring sensor 5 and evaluation unit 13 can be employed and the requirements made of the tolerances of the measuring sensor 5 can be further reduced which, in turn, leads to even simpler, more cost-effective and more robust or more reliable measuring sensors.

The cavity 11 of the Fabry-Perot measuring sensors 5 according to prior art must be coated in order to increase the contrast or the signal-to-noise ratio for the partially transmissive mirrors. However, the method according to the invention now permits the use of uncoated cavities 11, i.e. the Fresnel reflection of approximately 4% of a normal glass surface is already sufficient for example for the formation of a partially transmissive mirror. This leads, on the one hand, to less expensive and more robust measuring sensors and, on the other hand, the application range of the sensors can be shifted toward higher temperatures since the coatings, no longer necessary, typically determine the maximal application temperature.

A further advantage of the method according to the invention is the fact that as the result the absolute optical path length difference ($d_{Gap}$) is obtained directly in a physical path length unit, for example nm. The sole precondition is the use of a calibrated (commercially available) spectrometer 6. In this case from the measured spectrum the optical path length difference of the sensor cavity can be calculated directly and unambiguously. All evaluation units based on the known interferometer principle must per force be calibrated in order for the assignment of sensor element to optical path length difference to become possible. Such a calibration always entails additional expenditures. For the evaluation methods according to US 2005/0151975 A1, Melnyk, which are based on spectrometric measurements and subsequent correlation, a large quantity of reference spectra must in each instance also be generated or measured and subsequently be stored. By correlation of the measured signal with the reference spectra the output signal can subsequently be calculated. Under this aspect, the calibration is contained in the reference spectra and it also entails expenditures to generate these and additional resources for their storage are necessary.

FIG. 6 shows a spectrum which was measured with a commercially available OEM spectrometer. The spectrometer had a resolution of 2.9 nm . . . 3.3 nm FWHM (wavelength dependent) and a wavelength range of 430 nm . . . 730 nm. As the linear sensor array 7 in the spectrometer 6 a CMOS array with 512 sensor elements (pixels) was utilized. The measuring structure corresponded to the depiction in FIG. 5. As the light source 2 a white LED was utilized. As the measuring sensor 5 a preferred diaphragm-based Fabry-Perot pressure measuring sensor was employed. The measuring time or integration time of the sensor element was 1 ms.

From this measured spectrum now the interferogram was calculated by means of the method according to the invention. This is depicted in FIGS. 7 and 7a. FIG. 7a represents an enlarged segment of FIG. 7 in the proximity of an extremal amplitude value ($I_{extremal}$) with the associated calculated value for an optical path length difference ($d_{Gap}$).

The intensity values I(d) of the interferogram in the present preferred example were calculated for optical path length differences (d) of 20 µm to 60 µm. These optical path length differences correspond to geometric mirror distances ($d_{geo}$) of 10 µm to 30 µm since the sensor was filled with air (refractive index n~1). The calculated interferogram, as depicted in FIGS. 7 and 7a, has a contrast (maximal value−minimal value/((maximal value+minimal value)/2) of 33.5% and it is absolutely possible without encountering any problem to determine the location ($d_{Gap}$) of the extremal amplitude value ($I_{extremal}$) by means of a quadratic fit according to formula (4). This yields for the example a value ($d_{Gap}$) of 37,212.80 nm. The measured standard deviation was 0.01169 nm.

An advantageous application of the method is its employment for precise temperature measurements, in particular for large temperature ranges and/or at high temperatures. For this purpose the measuring cell 5 is implemented as a temperature measuring cell in which a temperature sensitive element 18 is provided which, as a function of the temperature, changes or varies the optical path length difference ($d_{Gap}$) of cavity 11 accordingly, as is depicted schematically in FIG. 9 by example. The change of the optical path length difference ($d_{Gap}$) of cavity 11 can be generated for example through a change of a material expansion of a temperature-sensitive material wherein this movement or expansion is preferably coupled with at least one of the mirrors 19, 19', which can also be partially transmissive, such that the distance between the mirrors 19 and 19' changes as a function of the temperature. In this case the temperature-dependent material 18 itself forms the cavity 11 and has on its surface on both sides, and spaced apart through the material 18, reflecting surfaces 19, 19' between which at least a portion of the coupled-in light is reflected back and forth. As a function of the temperature the material 18 changes its thickness and thus the mirror distance $d_{geo}$ and as a result, after the evaluation according to the present invention, an output signal is obtained which corresponds to the temperature at the measuring cell 5.

It is also readily possible to apply a temperature-sensitive material 18 such that it borders the cavity and/or outside of the cavity 11 such that for example only one of the mirrors 19, 19' is moved through the expansion of material 18. In this case it is simply necessary to ensure that the expansion movement of the material 18 is transmitted to at least one of the mirrors 19, 19' such that the mirror distance $d_{geo}$ changes correspondingly.

Apart from a mechanical change of the mirror distance or of the optical path length difference, it is also possible to form the change of the optical path length difference ($d_{Gap}$) of cavity 11 through a change of the refractive index in the path of the light thereby that, for example, under mechanical and/or thermal stress of a material its refractive index changes and this interacts with the coupled-in light.

The change of the optical path length difference ($d_{Gap}$) of cavity 11 can also be formed by a combination of change of expansion and change of refractive index.

Figure 8:
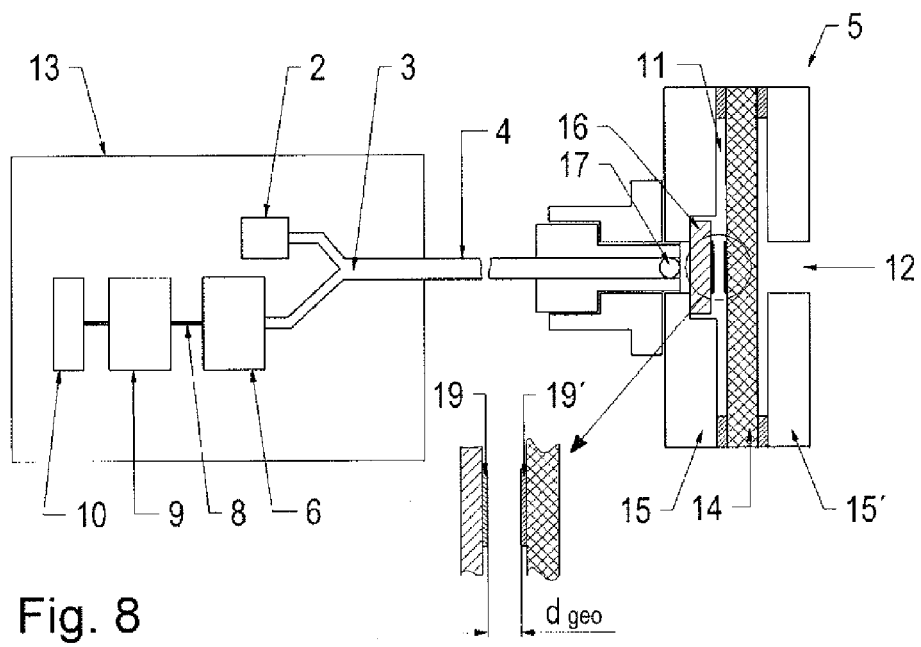

As already previously explained, the introduced method is especially suitable for application for pressure measurements as is depicted in FIG. 8. The measuring cell 5 with cavity 11 is implemented as a pressure measuring cell by providing a pressure-sensitive element which, through a pressure-dependent deformation, such as an expansion, correspondingly changes the optical path length difference ($d_{Gap}$) of cavity 11 as a function of the pressure.

As the pressure-sensitive element is preferably suitable a diaphragm 14, which is located at one end of cavity 11 and, as a function of the pressure, is correspondingly strongly deflected and consequently correspondingly changes the optical path length difference ($d_{Gap}$) by changing the geometric path length.

A substantially preferred application, as already previously explained, is the formation of the pressure measuring cell 5 as a vacuum pressure measuring cell, wherein the pressure-sensitive element preferably comprises a diaphragm 14, which is disposed at one end of cavity 11 and closes off the latter such that it is vacuum-tight. The diaphragm 14 is herein disposed between a first housing body 15 and a second housing body 15' such that it forms a seal on the margin. The housing bodies 15, 15' are advantageously developed in the form of plates and are comprised of ceramic material such as aluminum oxide and/or sapphire. The housing bodies 15, 15' are disposed such that they are spaced apart from diaphragm 14 such that on each side of the diaphragm 14 one gap-form space is formed. The gap-form space between the first housing body 15 and the diaphragm 14 is evacuated and forms a reference vacuum volume 11 and simultaneously the cavity 11. The light is conducted with the optical waveguide 4 to the first housing body 15 and, for example, coupled via a lens 17 and a window 16 in the cavity 11. The window 16 can be disposed as a separate part in a recess of the first housing body 15 forming a sealing and/or the entire first housing body 15 can be comprised of transparent material, such as for example of sapphire. In the proximity of the light to be reflected in the cavity 11, surfaces of the window 16 and of the diaphragm 14 are developed as mirrors 19, 19', wherein at least the mirror of the coupled-in side is developed such that it is partially transmissive. At a suitable surface quality these surfaces are directly utilizable as mirror faces, however, they can also be coated in known manner. The second gap-form space on the other side of the diaphragm, which space is delimited by the second housing body 15', forms the measuring vacuum which, via an opening in the second housing body 15' and via connection means for the measuring cell 5, communicates with the media, for example of a vacuum process installation, to be measured.

Compared to prior art, especially advantageous is the combination of a commercially available spectrometer 6 with the proposed new method for the evaluation or demodulation of the optical signal from an interferometric (for example Fabry-Perot) sensor. This advantageous combination permits in particular also replacing the corresponding interferometers, which are commercially available on the market, with a more cost-effective, simpler and therefore more robust solution. Compared to the solutions offered on the market, which are spectrometer based, the present invention in summary has the following advantages:

the invention permits the use of significantly simpler (lower resolution, linear sensors with fewer sensor elements (pixels) and therewith also significantly more cost-effective spectrometers 6 (€200.00 instead of $1500.00), and it does so at least at constant or even better measuring accuracy, simpler spectrometers with smaller linear sensor arrays and consequently fewer sensor elements generate fewer data, which, in turn, reduces the requirements made of the measuring value processing (A/D conversion, evaluation, . . . ) and therewith leads to shorter cycle times (1 ms instead of 50 ms); due to the shorter cycle time it is, for example, possible to form the mean of several measuring values and therewith to increase the measuring accuracy further, the method according to the invention, in comparison to the correlation methods according to prior art, is significantly simpler and can therefore be implemented very simply, and therewith correspondingly robust, and therefore requires also shorter calculating times which, in turn, permits shorter measuring cycles, the method according to the invention yields directly the absolute sought measuring value and therefore requires neither reference spectra nor the storage elements necessary for their storage which, in turn, saves complexity and costs and increases the reliability, the method according to the invention permits building Fabry-Perot sensors whose cavity (for the purpose of improving contrast or the signal-to-noise ratio) no longer needs to be coated and therewith can be manufactured simpler and more cost-effectively. In addition, the employment range of such sensors can be shifted toward higher temperatures since such coatings, which no longer are necessary, typically determine the maximal employment temperature.

What is claimed is:

1. Method for evaluating a measured parameter (12) with a measuring cell (5) comprising a cavity (11) which generates an optical path length difference ($d_{Gap}$) for light which changes by correspondingly following a variation of a measured parameter (12), the method comprising:

introducing light (1) into the cavity (11) from a white light source (2) with the aid of an optical waveguide (4) via a coupler (3) disposed in the path of the optical waveguide (4);

coupling out at least a portion of the light (1') reflected back from the cavity (11) into the optical waveguide with the aid of the coupler (3) and conducting the reflected light (1') to an optical spectrometer (6);

determining the optical spectrum of the reflected light (1') in the spectrometer (6) and generating a spectrometer signal (8);

conducting the spectrometer signal (8) to a computing unit (9);

directly converting the spectrometer signal (8) using the computing unit (9) into an interferogram I(d);

determining from the intensity progression within the interferogram, the location of the particular extremal amplitude value ($I_{extremal}$) that directly represents the particular value of the optical path length difference ($d_{Gap}$) in the cavity which comprises the measured parameter (12);

the cavity (11) comprising two mirrors (19, 19') spaced apart by a geometric mirror distance ($d_{geo}$), at least one of the mirrors (19, 19') being partially transmissive;

a portion of the light being reflected back and forth between the mirrors (19, 19') so that the optical spectrum is determined by the optical path length difference ($d_{Gap}$); and wherein the geometric mirror distance ($d_{geo}$) is calculated directly and absolutely in a selected physical unit of length, from the optical spectrum without circuitous routes via correlations.

2. Method as claimed in claim 1, wherein the conversion of the spectrometer signal (8) into the interferogram through the computing unit (9) takes place with a function which comprises at least, and at least in a first approximation, a cosine function.

3. Method as claimed in claim 2, wherein the conversion of the spectrometer signal (8) to an interferogram through the computing unit (9) takes place with a function which at least, and at least in a first approximation, contains the following form:

$$I'(d_k) = \sum_{1}^{m0} S_\lambda(\lambda_m) * \cos(2 * \pi * d_k / \lambda_m).$$

4. Method as claimed in claim 1, wherein the calculated optical path length difference ($d_{Gap}$) represents not a relative but an absolute value with the selected physical unit of length.

5. Method as claimed in claim 1, wherein the cavity (11) generates an optical path length difference ($d_{Gap}$) in the range of 10.0 μm to 400 μm.

6. Method as claimed in claim 1, wherein the measuring cell (5) is formed as a temperature measuring cell with a temperature-sensitive element (18) which, as a function of the temperature, changes the optical path length difference ($d_{Gap}$) of the cavity (11) correspondingly.

7. Method as claimed in claim 1, wherein the change of the optical path length difference ($d_{Gap}$) of the cavity (11) is generated through a change of a material expansion, which is coupled with at least one of the mirrors (19, 19').

8. Method as claimed in claim 1, wherein the change of the optical path length difference ($d_{Gap}$) of the cavity (11) is formed by a change of the refractive index of a material (18) disposed in the cavity (11) in the path of the light.

9. Method as claimed in claim 8, wherein the change of the optical path length difference ($d_{Gap}$) of the cavity (11) is formed by a combination of the change of expansion and change of refractive index.

10. Method as claimed in claim 1, wherein the measuring cell (5) is a pressure measuring cell which comprises a pressure-sensitive element which through a pressure-dependent deformation, changes the optical path length difference ($d_{Gap}$) of the cavity (11) correspondingly as a function of the pressure.

11. Method as claimed in claim 10, wherein the pressure measuring cell has a pressure-sensitive element that comprises a diaphragm (14) which forms at least a part of the cavity (11) and which is deflected as a function of the pressure and consequently changes the optical path length difference ($d_{Gap}$) by changing the geometric path length ($d_{Geo}$).

12. Method as claimed in claim 11, wherein the pressure measuring cell (5) is a vacuum pressure measuring cell and has a pressure-sensitive element preferably that comprises a diaphragm (14) which forms at least a part of the cavity (11) and closes off the cavity such that it is vacuum-tight.

13. Method as claimed in claim 1, wherein the computing unit (9) is selected from the group including at least one of: a microprocessor and a Digital Signal Processor (DSP) and a Field Programmable Gate Array (FPGA) and a gate array.

14. Method as claimed in claim 1, wherein the selected physical unit of length is a nanometer.

15. Method as claimed in claim 1, wherein the cavity (11) generates an optical path length difference ($d_{Gap}$) in the range of from 20.0 μm to 60.0 μm.

16. Method for evaluating a measured parameter (12) with a measuring cell (5) comprising a cavity (11) which generates an optical path length difference ($d_{Gap}$) for light which changes by correspondingly following a variation of a measured parameter (12), the method comprising:
- introducing light (1) from a white light source (2) with the aid of at least one optical waveguide (4) into the cavity (11);
- coupling out at least a portion of the light reflected from the cavity (11) with at least one further or several further optical waveguides and conducting the reflected light (1') to an optical spectrometer (6);
- determining the optical spectrum of the reflected light (1') in the spectrometer (6) and generating a spectrometer signal (8);
- conducting the spectrometer signal (8) to a computing unit (9);
- directly converting the spectrometer signal (8) using the computing unit (9) into an interferogram I(d);
- determining from the intensity progression within the interferogram, the location of the particular extremal amplitude value ($I_{extremal}$) that directly represents the particular value of the optical path length difference ($d_{Gap}$) in the cavity which comprises the measured parameter (12);
- the cavity (11) comprising two mirrors (19, 19') spaced apart by a geometric mirror distance ($d_{geo}$), at least one of the mirrors (19, 19') being partially transmissive;
- a portion of the light being reflected back and forth between the mirrors (19, 19') so that the optical spectrum is determined by the optical path length difference ($d_{Gap}$); and
- wherein the geometric mirror distance ($d_{geo}$) is calculated directly and absolutely in a selected physical unit of length, from the optical spectrum without circuitous routes via correlations.

17. Method as claimed in claim 16, wherein the conversion of the spectrometer signal (8) into the interferogram through the computing unit (9) takes place with a function which comprises at least, and at least in a first approximation, a cosine function.

18. Method as claimed in claim 17, wherein the conversion of the spectrometer signal (8) to an interferogram through the computing unit (9) takes place with a function which at least, and at least in a first approximation, contains the following form:

$$I'(d_k) = \sum_{1}^{m0} S_\lambda(\lambda_m) * \cos(2 * \pi * d_k / \lambda_m).$$

19. Method as claimed in claim 16, wherein the calculated optical path length difference ($d_{Gap}$) represents not a relative but an absolute value with the selected physical unit of length.

20. Method as claimed in claim 16, wherein the cavity (11) generates an optical path length difference ($d_{Gap}$) in the range of 10.0 μm to 400 μm.

21. Method as claimed in claim 16, wherein the cavity (11) generates an optical path length difference ($d_{Gap}$) in the range of from 20.0 μm to 60.0 μm.

22. Method as claimed in claim 16, wherein the measuring cell (5) is formed as a temperature measuring cell with a temperature-sensitive element (18) which, as a function of the temperature, changes the optical path length difference ($d_{Gap}$) of the cavity (11) correspondingly.

23. Method as claimed in claim 16, wherein the change of the optical path length difference ($d_{Gap}$) of the cavity (11) is generated through a change of a material expansion, which is coupled with at least one of the mirrors (19, 19').

24. Method as claimed in claim 16, wherein the change of the optical path length difference ($d_{Gap}$) of the cavity (11) is formed by a change of the refractive index of a material (18) disposed in the cavity (11) in the path of the light.

25. Method as claimed in claim 24, wherein the change of the optical path length difference ($d_{Gap}$) of the cavity (11) is formed by a combination of the change of expansion and change of refractive index.

26. Method as claimed in claim 16, wherein the measuring cell (5) is a pressure measuring cell which comprises a pressure-sensitive element which through a pressure-dependent deformation, changes the optical path length difference ($d_{Gap}$) of the cavity (11) correspondingly as a function of the pressure.

27. Method as claimed in claim 26, wherein the pressure measuring cell has a pressure-sensitive element that comprises a diaphragm (14) which forms at least a part of the cavity (11) and which is deflected as a function of the pressure and consequently changes the optical path length difference ($d_{Gap}$) by changing the geometric path length ($d_{geo}$).

28. Method as claimed in claim 27, wherein the pressure measuring cell (5) is a vacuum pressure measuring cell and has a pressure-sensitive element that comprises a diaphragm (14) which forms at least a part of the cavity (11) and closes off the cavity such that it is vacuum-tight.

29. Method as claimed in claim 16, wherein the computing unit (9) is selected from the group including at least one of: a microprocessor and a Digital Signal Processor (DSP) and a Field Programmable Gate Array (FPGA) and a gate array.

30. Method as claimed in claim 16, wherein the selected physical unit of length is a nanometer.

31. Measuring arrangement with a measuring cell (5) comprising a cavity (11) which generates an optical path length difference ($d_{Gap}$) for light which changes by correspondingly following the variation of a measured parameter (12), the measuring arrangement comprising:
- a white light source (2) connected to the cavity (11) with an optical waveguide (4) via a coupler (3) disposed in the path of the optical waveguide (4);
- an optical spectrometer (6) connected with the coupler (3) and which couples out at least a portion of the light (1') reflected back from the cavity (11) into the optical waveguide (4);
- a computing unit (9) connected with the spectrometer (6) via a corresponding electric interface;
- the computing unit (9) converting the spectrometer signal (8) directly to an interferogram I(d), and from its intensity progression the location of the particular extremal amplitude value $I_{extremal}$ is determined and this particular location represents directly the particular value of the optical path length difference ($d_{Gap}$) in the cavity (11) which comprises the measured parameter (12);
- the cavity (11) comprising two mirrors (19, 19') spaced apart by a geometric mirror distance ($d_{geo}$) and at least one of the mirrors (19, 19') being partially transmissive;
- a portion of the light being reflected back and forth between the mirrors (19, 19') and hereby the optical spectrum being determined by the optical path length difference ($d_{Gap}$); and
- the geometric mirror distance ($d_{geo}$) being determined directly and absolutely in a selected physical unit of length, from the optical spectrum without circuitous routes via correlations.

32. Measuring arrangement as claimed in claim 31, wherein a function for the signal conversion in the computing unit (9), at least in a first approximation, contains a cosine function, and at least in a first approximation, is according to the form:

$$I'(d_k) = \sum_{1}^{m0} S_\lambda(\lambda_m) * \cos(2*\pi*d_k/\lambda_m).$$

33. Measuring arrangement as claimed in claim 31, wherein the measuring cell (5) is a temperature measuring cell in that the cavity (11) is interactively connected with a temperature-sensitive element (18) which, as a function of the temperature, changes the optical path length difference ($d_{Gap}$) of the cavity (11) correspondingly.

34. Measuring arrangement as claimed in claim 31, wherein the measuring cell (5) is a pressure measuring cell comprising a pressure-sensitive element which, through a pressure-dependent deformation, changes the optical path length difference ($d_{Gap}$) of the cavity (11) as a function of the pressure correspondingly.

35. Measuring arrangement as claimed in claim 34, wherein the pressure measuring cell (5) as a pressure-sensitive element comprising a diaphragm (14) which forms a part of the cavity (11) and which is deflected as a function of the pressure and that the pressure measuring cell (5) is a vacuum measuring cell.

36. Measuring arrangement as claimed in claim 35, wherein the pressure measuring cell (5) is a vacuum pressure measuring cell and has a pressure-sensitive element that comprises a diaphragm (14) which forms at least a part of the cavity (11) and closes off the cavity such that it is vacuum-tight.

37. Measuring arrangement as claimed in claim 31, wherein the selected physical unit of length is a nanometer.

38. Measuring arrangement as claimed in claim 31, wherein the geometric mirror distance ($d_{geo}$) is in the range of 5.0 µm to 200 µm.

39. Measuring arrangement as claimed in claim 31, wherein the geometric mirror distance ($d_{geo}$) is in the range of 10.0 µm to 30.0 µm.

40. Measuring arrangement as claimed in claim 31, wherein the calculated optical path length difference ($d_{Gap}$) represents not a relative but an absolute value with the selected physical unit of length.

41. Measuring arrangement as claimed in claim 31, wherein the change of the optical path length difference ($d_{Gap}$) of the cavity (11) is generated through a change of a material expansion, which is coupled with at least one of the mirrors (19, 19').

42. Measuring arrangement as claimed in claim 31, wherein the change of the optical path length difference ($d_{Gap}$) of the cavity (11) is formed by a change of the refractive index of a material (18) disposed in the cavity (11) in the path of the light.

43. Measuring arrangement as claimed in claim 42, wherein the change of the optical path length difference ($d_{Gap}$) of the cavity (11) is formed by a combination of the change of expansion and change of refractive index.

44. Measuring arrangement as claimed in claim 31, wherein the conversion of the spectrometer signal (8) into the interferogram through the computing unit (9) takes place with a function which comprises at least, and at least in a first approximation, a cosine function.

45. Measuring arrangement as claimed in claim 31 wherein the computing unit (9) is selected from the group including at least one of: a microprocessor and a Digital Signal Processor (DSP) and a Field Programmable Gate Array (FPGA) and a gate array.

46. Measuring arrangement with a measuring cell (5) comprising a cavity (11) which generates an optical path length difference ($d_{Gap}$) for light which changes by correspondingly following the variation of a measured parameter (12), the measuring arrangement comprising:

a white light source (2) connected to the cavity (11) with an optical waveguide (4);

an optical spectrometer (6);

at least one further separate optical waveguide connected with the cavity (11) and the spectrometer (6) for the conduction of light (1') reflected from the cavity (11) to the spectrometer (6);

a computing unit (9) connected with the spectrometer (6) via a corresponding electric interface;

the computing unit (9) converting the spectrometer signal (8) directly to an interferogram (I(d)), and from its intensity progression the location of the particular extremal amplitude value ($I_{extremal}$) is determined and this particular location represents directly the articular value of the optical path length difference ($d_{Gap}$) in the cavity (11) which comprises the measured parameter (12);

the cavity (11) comprising two mirrors (19, 19') spaced apart by a geometric mirror distance ($d_{geo}$) and at least one of the mirrors (19, 19') being partially transmissive;

a portion of the light being reflected back and forth between the mirrors (19, 19') and hereby the optical spectrum being determined by the optical path length difference ($d_{Gap}$); and the geometric mirror distance ($d_{geo}$) being determined directly and absolutely in a selected physical unit of length, from the optical spectrum without circuitous routes via correlations.

47. Measuring arrangement as claimed in claim 46, wherein the selected physical unit of length is a nanometer.

48. Measuring arrangement as claimed in claim 46, wherein the conversion of the spectrometer signal (8) into the interferogram through the computing unit (9) takes place with a function which comprises at least, and at least in a first approximation, a cosine function.

49. Measuring arrangement as claimed in claim 48, wherein the conversion of the spectrometer signal (8) to an interferogram through the computing unit (9) takes place with a function which at least, and at least in a first approximation, contains the following form:

$$I^1(d_k) = \sum_{1}^{m0} S_\lambda(\lambda_m) * \cos(2*\pi*d_k/\lambda_m).$$

50. Measuring arrangement as claimed in claim 46, wherein the calculated optical path length difference ($d_{Gap}$) represents not a relative but an absolute value with the selected physical unit of length.

51. Measuring arrangement as claimed in claim 46, wherein the geometric mirror distance ($d_{geo}$) is in the range of 5.0 µm to 200 µm.

52. Measuring arrangement as claimed in claim 46, wherein the geometric mirror distance ($d_{geo}$) is in the range of 10.0 µm to 30.0 µm.

53. Measuring arrangement as claimed in claim 46, wherein the measuring cell (5) is formed as a temperature measuring cell with a temperature-sensitive element (18) which, as a function of the temperature, changes the optical path length difference ($d_{Gap}$) of the cavity (11) correspondingly.

54. Measuring arrangement as claimed in claim 46, wherein the change of the optical path length difference ($d_{Gap}$) of the cavity (11) is generated through a change of a material expansion, which is coupled with at least one of the mirrors (19, 19').

55. Measuring arrangement as claimed in claim 46, wherein the change of the optical path length difference ($d_{Gap}$) of the cavity (11) is formed by a change of the refractive index of a material (18) disposed in the cavity (11) in the path of the light.

56. Measuring arrangement as claimed in claim 55, wherein the change of the optical path length difference ($d_{Gap}$) of the cavity (11) is formed by a combination of the change of expansion and change of refractive index.

57. Measuring arrangement as claimed in claim 46, wherein the measuring cell (5) is a pressure measuring cell which comprises a pressure-sensitive element which through a pressure-dependent deformation, changes the optical path length difference ($d_{Gap}$) of the cavity (11) correspondingly as a function of the pressure.

58. Measuring arrangement as claimed in claim 57, wherein the pressure measuring cell has a pressure-sensitive element that comprises a diaphragm (14) which forms at least a part of the cavity (11) and which is deflected as a function of the pressure and consequently changes the optical path length difference ($d_{Gap}$) by changing the geometric path length ($d_{geo}$).

59. Measuring arrangement as claimed in claim 58, wherein the pressure measuring cell (5) is a vacuum pressure measuring cell and has a pressure-sensitive element that comprises a diaphragm (14) which forms at least a part of the cavity (11) and closes off the cavity such that it is vacuum-tight.

60. Measuring arrangement as claimed in claim 46, wherein the computing unit (9) is selected from the group including at least one of: a microprocessor and a Digital Signal Processor (DSP) and a Field Programmable Gate Array (FPGA) and a gate array.

\* \* \* \* \*